US011334611B2

(12) United States Patent
Kikin-Gil et al.

(10) Patent No.: US 11,334,611 B2
(45) Date of Patent: May 17, 2022

(54) CONTENT ITEM SUMMARIZATION WITH CONTEXTUAL METADATA

(71) Applicant: Microsoft Technology Licensing, LLC, Redmond, WA (US)

(72) Inventors: Erez Kikin-Gil, Bellevue, WA (US); Daniel Yancy Parish, Seattle, WA (US); Ajitesh Kishore, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/915,498

(22) Filed: Jun. 29, 2020

(65) Prior Publication Data
US 2021/0406296 A1 Dec. 30, 2021

(51) Int. Cl.
*G06F 16/34* (2019.01)
*G06F 16/387* (2019.01)
*G06N 20/00* (2019.01)
*G06F 16/383* (2019.01)

(52) U.S. Cl.
CPC .......... *G06F 16/345* (2019.01); *G06F 16/383* (2019.01); *G06F 16/387* (2019.01); *G06N 20/00* (2019.01)

(58) Field of Classification Search
CPC .... G06F 16/345; G06F 16/387; G06F 16/383; G06N 20/00
See application file for complete search history.

(56) References Cited

U.S. PATENT DOCUMENTS

| 10,062,101 | B2 | 8/2018 | Mahmoud et al. | |
|---|---|---|---|---|
| 10,169,453 | B2 | 1/2019 | Luo et al. | |
| 2009/0177995 | A1* | 7/2009 | Gould | G06F 3/04855 715/786 |
| 2011/0161085 | A1* | 6/2011 | Boda | G06Q 30/02 704/260 |
| 2012/0197630 | A1* | 8/2012 | Lyons | G06F 16/345 704/9 |
| 2012/0290289 | A1 | 11/2012 | Manera et al. | |
| 2018/0040056 | A1* | 2/2018 | Mahmoud | G06N 5/02 |
| 2018/0048595 | A1 | 2/2018 | Dotan-Cohen et al. | |

OTHER PUBLICATIONS

"International Search Report and Written Opinion Issued in PCT Application No. PCT/US2021/028523", dated Jun. 24, 2021, 10 Pages.

* cited by examiner

*Primary Examiner* — Sanchita Roy
(74) *Attorney, Agent, or Firm* — Alleman Hall Creasman & Tuttle LLP

(57) ABSTRACT

A computing system, including a processor configured to receive a content item. The processor may extract a plurality of content item features from the content item and receive a user request to summarize the content item. The user request may have associated contextual metadata indicating a spatiotemporal context in which the user request is received. Based on the contextual metadata, the processor may determine an estimated distraction level for the user. The processor may select a subset of the plurality of content item features based on the contextual metadata. The processor may generate a content item summary including the subset of the plurality of content item features based at least in part on the estimated distraction level. The processor may convey the content item summary for output on one or more output devices.

17 Claims, 14 Drawing Sheets

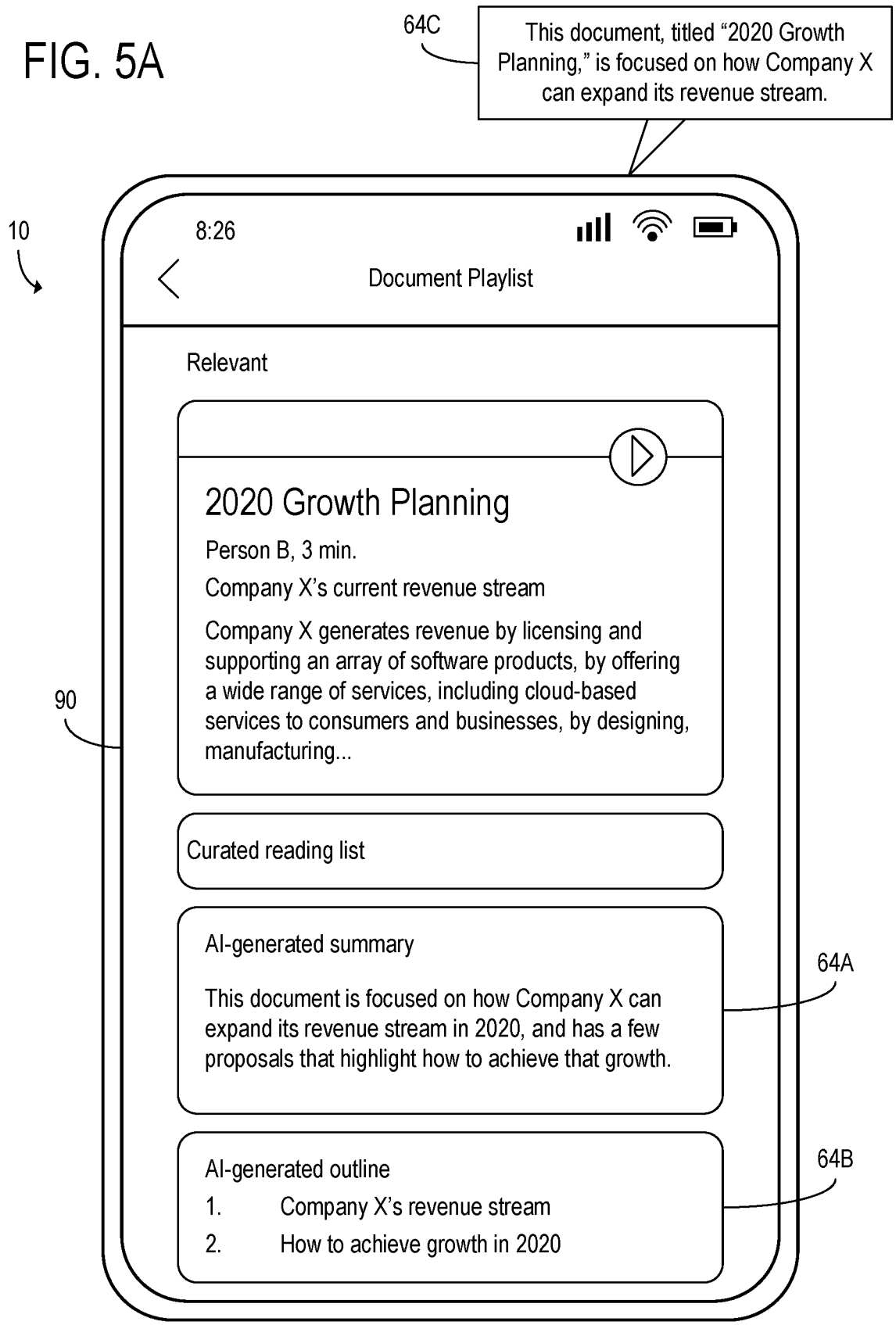

FIG. 5B

What are the document's key points? — 70A

The key points are:
1. Increase investment in Machine Learning Medical Analysis
2. Advance our engagement with medical facilities in South Africa
3. Renew our partnerships with Boston-based Company Y

72A

10

8:26

Document Playlist

AI-generated summary

This document is focused on how Company X can expand its revenue stream in 2020, and has a few proposals that highlight how to achieve that growth.

64A

AI-generated outline
1. Company X's revenue stream
2. How to achieve growth in 2020
3. Conclusion

64B

90

AI-generated key points
1. Increase investment in Machine Learning Medical Analysis
2. Advance our engagement with medical facilities in South Africa
3. Renew our partnerships with Boston-based Company Y

64D

CONTENT ITEM SUMMARIZATION WITH CONTEXTUAL METADATA

BACKGROUND

Automated summarization of content may be used in contexts such as education, business management, and news. For example, computer-generated summaries of text articles, audio, or video may be generated to allow a user to more quickly consume information included in the source content. Users may also use computer-generated summaries to assist with information recall. For example, a user may review a computer-generated summary when preparing to give a presentation on the summarized material.

SUMMARY

According to one aspect of the present disclosure, a computing system is provided, including a processor configured to receive a content item. The processor may be further configured to extract a plurality of content item features from the content item. The processor may be further configured to receive a user request to summarize the content item. The user request may have associated contextual metadata indicating a spatiotemporal context in which the user request is received. Based on the contextual metadata, the processor may be further configured to determine an estimated distraction level for the user. The processor may be further configured to select a subset of the plurality of content item features based on the contextual metadata. The processor may be further configured to generate a content item summary including the subset of the plurality of content item features based at least in part on the estimated distraction level. The processor may be further configured to convey the content item summary for output on one or more output devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5A shows the client computing device when the client computing device outputs a content item summary, according to the embodiment of FIG. 1.

FIGS. 5B-5D show the example client computing device of FIG. 5A when the client computing device receives additional user inputs.

DETAILED DESCRIPTION

While techniques for programmatically generating summaries of content items exist as described above, in general these existing methods suffer from the drawback that they cannot account for differences in contexts in which users may request summaries of the content. Although of some use to some users, a one-size-fits-all summary generated according to these methods may be ill-suited to a particular user's context and therefore of little value to that particular user. For example, if a user has a very short amount of time in which to view the summary, a summary generated using existing methods may be too long for the user to consume in the amount of time the user has available. As another example, if the user is performing a task such as driving that requires attention to visual phenomena, the user may be unable to attend to displayed text or images that are included in the summary.

Figure 1:
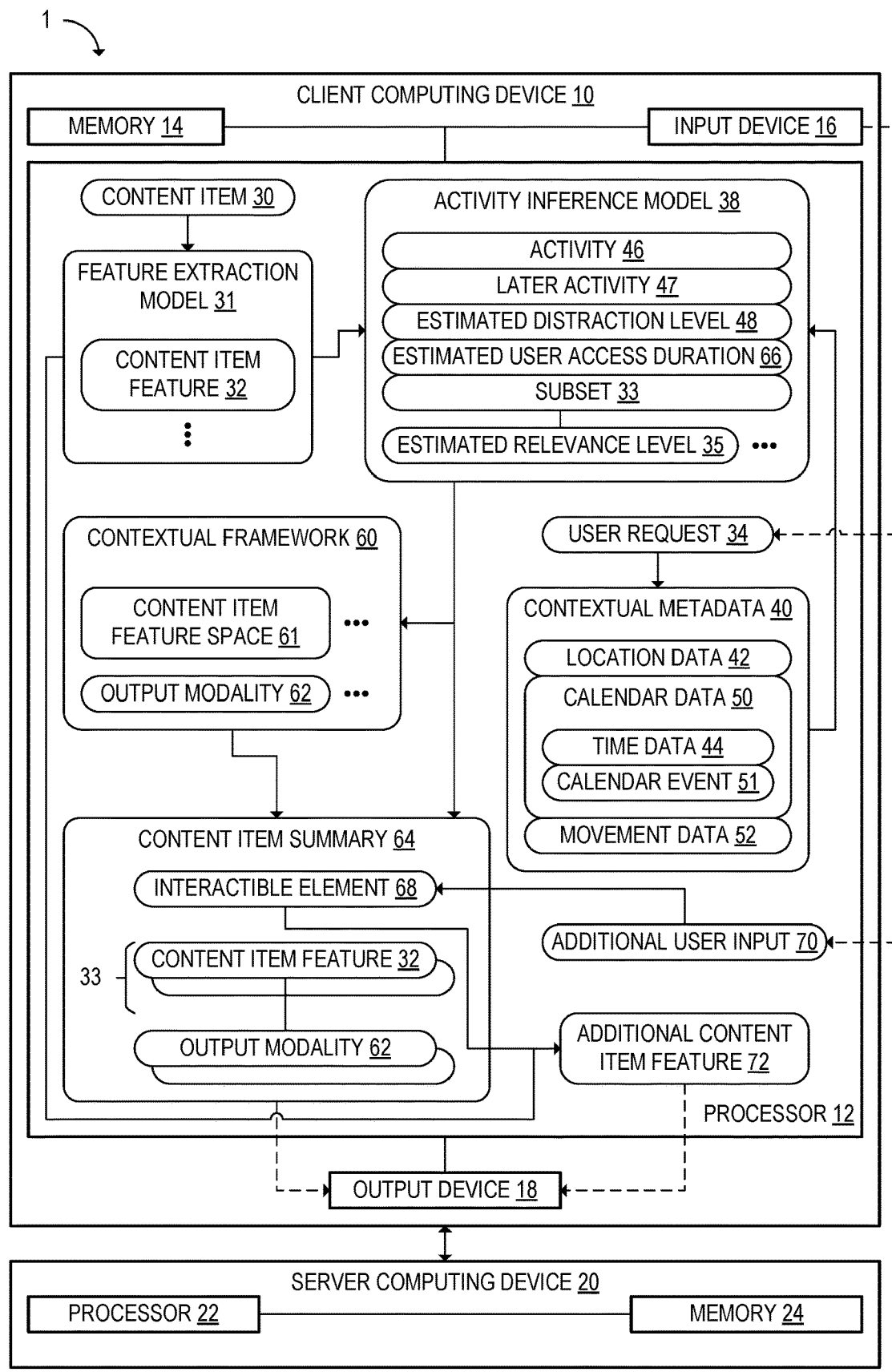
FIG. 1 shows a computing system including a client computing device and a server computing device, according to one embodiment of the present disclosure.

In order to address the above shortcomings of existing approaches to programmatic content summarization, systems and methods for generating a content item summary are provided below. FIG. 1 schematically shows an example computing system 1, according to one example embodiment. The example computing system 1 of FIG. 1 includes a client computing device 10 and a server computing device 20 that is configured to communicate with the client computing device 10. The functionality of the client computing device 10 and the server computing device 20, or the components thereof, may be distributed across a plurality of communicatively coupled computing devices. For example, the functionality of the server computing device 20 may be distributed across a plurality of server computing devices 20 located in a data center. As another example, one or more of the functions described below as occurring at the client computing device 10 may be offloaded to the server computing device 20. The client computing device 10 may, for example, be a thin client device.

As shown in FIG. 1, the client computing device 10 may include a processor 12 and memory 14, and the server computing device 20 may include a processor 22 and memory 24. The processor 12 and the processor 22 may each include one or more cores. The memory 14 and the memory 24 may be operatively coupled to the processor 12 and the processor 22 respectively and may each include volatile and/or non-volatile memory.

In addition, the client computing device 10 may include one or more input devices 16 and one or more output devices 18. For example, the one or more input devices 16 may include at least one of a keyboard, a mouse, a touchscreen, a trackpad, an accelerometer, a microphone, or one or more other types of input device 16. The one or more output devices 18 may include at least one of a display, a speaker, a haptic feedback unit, or one or more other types of output devices 18. One or more input devices and/or one or more output devices may be further included in the server computing device 20.

As shown in FIG. 1, the processor 12 of the client computing device 10 may be configured to receive a content item 30. For example, the content item may be a text document, a sound file, an image, a video, a slideshow, a spreadsheet, or some other type of content item. In some embodiments, the processor 12 may be configured to receive a plurality of content items 30.

The processor 12 may be further configured to receive a user request 34 to summarize the content item 30. The user request 34 may be made at the client computing device 10 using the one or more input devices 16. For example, the user request 34 may be a voice command, or may be a selection of an interactable icon displayed on a display as part of a graphical user interface (GUI). The user request 34 may be a request to summarize a plurality of content items 30, which may have the same file format or different file formats. As discussed below, the processor 12 may be configured to programmatically generate a content item summary 64 for the content item 30 in response to receiving the user request 34. In embodiments in which the processor 12 receives a plurality of content items 30, the processor 12 may be configured to receive a user request 34 to summarize the plurality of content items 30 and may be further configured to generate a combined summary of those content items 30.

The user request 34 may have associated contextual metadata 40 that indicates a spatiotemporal context in which the user request 34 is received. In response to receiving the user request 34, the processor 12 may be configured to acquire the contextual metadata 40 from one or more hardware devices included in the client computing device 10. Some or all of the contextual metadata 40 may additionally or alternatively be received from one or more application programs executed by the processor 12 of the client computing device 10 or the processor 22 of the server computing device 20.

The contextual metadata 40 may, for example, include location data 42 that indicates a spatial location of the client computing device 10. The contextual metadata 40 may additionally or alternatively include time data 44 that indicates a time at which the user request 34 is received. In embodiments in which the client computing device 10 is a mobile computing device, the contextual metadata 40 may include movement data 52 for the client computing device 10. The movement data 52 may include a speed and a direction in which the client computing device 10 is traveling.

Figure 2:
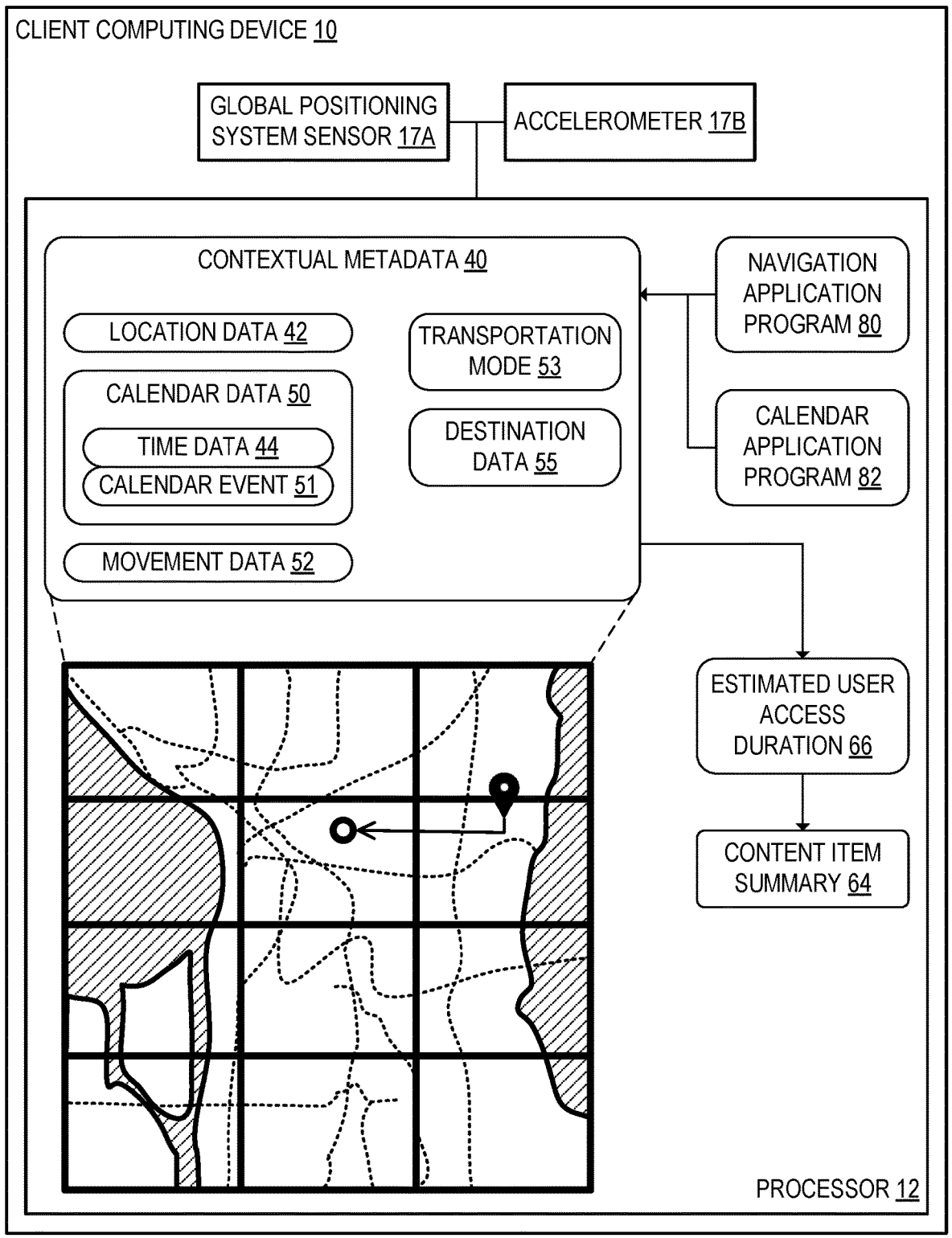
FIG. 2 shows the client computing device when the processor is configured to receive location data and movement data, according to the embodiment of FIG. 1.

FIG. 2 shows an example client computing device 10 in which the processor 12 is configured to obtain contextual metadata 40 including movement data 52 when a user request 34 to summarize a content item 30 is received. The movement data 52 may, for example, be collected by the processor 12 from a Global Positioning System (GPS) sensor 17A included in the client computing device 10. Additionally or alternatively, the client computing device may include an accelerometer 17B configured to collect movement data 52. The movement data 52 may be collected via other types of sensors in other embodiments.

In the example of FIG. 2, the processor 12 may be further configured to receive contextual metadata 40 from a navigation application program 80 executed at the processor 12. The navigation application program 80 may, for example, indicate a transportation mode 53 that the user of the client computing device 10 is using to travel. As another example, the navigation application program 80 may indicate destination data 55 of a destination to which the user is traveling, such as a location of the destination. The location data 42 may be received from the navigation application program 80 in some embodiments. The location data 42, the transportation mode 53, and/or the destination data 55 may be included in the contextual metadata 40.

Figure 3:
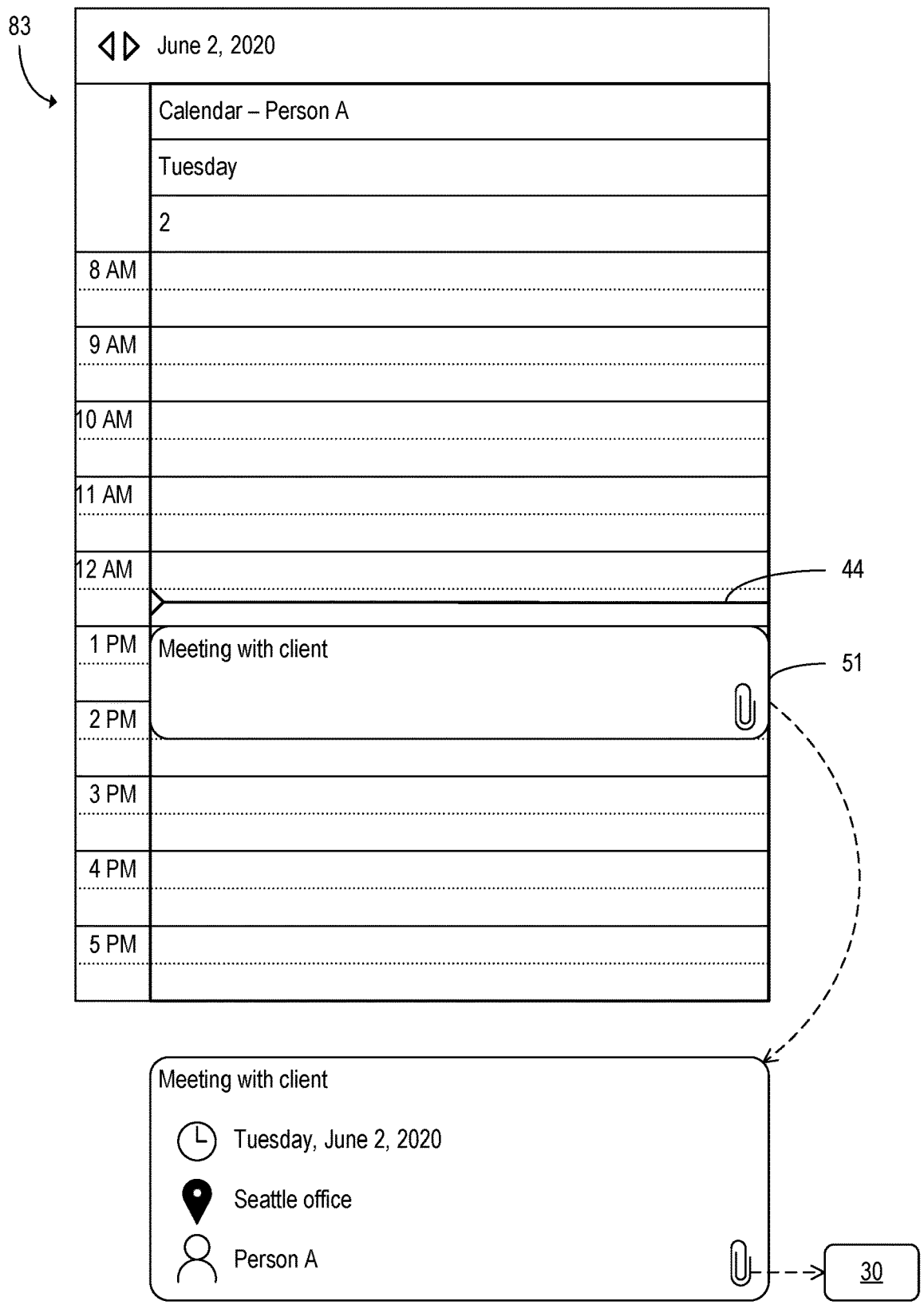
FIG. 3 shows an example graphical user interface of a calendar application program from which the processor may be configured to receive calendar data, according to the embodiment of FIG. 1.

The contextual metadata 40 may further include calendar data 50 for the user. The calendar data 50 may be received from a calendar application program 82 executed at the processor 12. FIG. 3 shows an example calendar application program GUI 83 in which the calendar data 50 may be represented. The calendar data 50 may, as shown in FIG. 3, include the time data 44 that indicates the time at which the user requests the content item summary 64. In the calendar application program GUI 83, the time data 44 is represented by a horizontal line at the current time at which the user views the calendar application program GUI 83. The calendar data 50 may further include one or more calendar events 51, each of which may have a corresponding starting time and ending time. Each calendar event 51 included in the calendar data 50 may further include one or more of an event description, a location at which the calendar event 51 is indicated to occur, and a participants list. In the example of FIG. 3, the event description of the calendar event 51 is "Meeting with client," the location is "Seattle office," and the participants list is "Person A."

A calendar event 51 may further include one or more attached files. The content item 30 for which the user requests a summary may be an attached file included in a calendar event 51. In some embodiments, the user request 34 may be a request to summarize a plurality of attached files for a calendar event 51.

The contextual metadata 40 is not limited to the specific categories of data shown in FIGS. 1-3 and may additionally or alternatively include other types of contextual metadata 40 in some embodiments.

Returning to FIG. 1, the processor 12 may be further configured to extract a plurality of content item features 32 from the content item 30. This extraction may be performed in response to receiving the user request 34 to summarize the content item 30 or may alternatively be at least partially performed prior to receiving the user request 34. The plurality of content item features 32 may include one or more words, phrases, sentences, images, table entries, links, or other elements included in the content item 30. In embodiments in which the processor 12 receives a user request 34 to summarize a plurality of content items 30, the processor 12 may be configured to extract content item features 32 from each of those content items 30.

The processor 12 may extract the plurality of content item features 32 at a feature extraction model 31, which may be a machine learning model or a rule-based model. In some embodiments, the feature extraction model 31 may be configured to extract content item features 32 having a plurality of different levels of data granularity. For example, the feature extraction model 31 may be configured to extract the sentence "Revenues decreased by 3% in the third quarter of 2019" as a content item feature 32, and to further extract the content item features "revenues," "decreased," "3%," "third," "quarter," and "2019." The feature extraction model 31 may, as in the above example, omit structural words such as "by," "in," "the," and "of" from the plurality of extracted content item features 32. In such embodiments, the plurality of content item features 32 extracted by the feature extraction model 31 may further include one or more syntactic structure indicators that encode syntactic relationships between words, phrases, or sentences included in the content item 30.

Based on the contextual metadata 40, the processor 12 may be further configured to determine an activity 46 which the user is performing when the user request 34 is received. In some embodiments, the activity 46 may be determined at an activity inference model 38, which may be a machine learning model or a rule-based model. The activity inference model 38 may be executed on the processor 12 of the client computing device 10 or the processor 22 of the server computing device 20. In some embodiments, rather than outputting a single activity 46, the activity inference model 38 may be configured to output a list of activities 46 with associated probabilities.

The processor 12 may be configured to determine the activity 46 based at least in part on the location data 42. A location may, for example, be associated in the activity inference model 38 with an activity which the user is likely to perform at that location. For example, based on location data 42 indicating that the client computing device 10 is located at the user's workplace, the processor 12 may be configured to determine that the user is likely to be working. In some embodiments, the activity inference model 38 may be customized according to the user's location-dependent activity patterns, as discussed in further detail below.

The determination of the activity 46 may also be based at least in part on the time data 44 included in the calendar data 50. The processor 12 may determine, for example, that a user who requests a summary of a content item 30 at 1:00 PM is likely to be eating lunch. In embodiments in which the processor 12 uses the time data 44 when determining the activity 46, the processor 12 may be further configured to determine the activity 46 based at least in part on the one or more calendar events 51 included in the calendar data 50. For example, the processor 12 may determine, based on the event description "Organic chemistry exam review" for a calendar event 51 included in the contextual metadata 40, that the activity 46 is "studying." When the processor 12 determines the activity 46 based at least in part on a calendar event 51, that calendar event 51 may be a calendar event 51 that is currently occurring for the user, as indicated by the time data 44. Alternatively, the processor 12 may be configured to infer the activity 46 in which the user is currently engaged based at least in part on one or more calendar events 51 occurring at other times. For example, when the processor 12 receives and user request 34 during a period of time between a first calendar event 51 indicated as occurring at a first location and a second calendar event 51 indicated as occurring at a second location, the processor 12 may determine, based on an estimated travel time between the first location and the second location, that the user is likely to be traveling.

In embodiments in which the processor 12 uses the location data 42 when determining the activity, the processor 12 may be configured to determine the activity 46 based at least in part on the movement data 52. For example, the processor 12 may determine from the user's location data 42 and movement data 52 that since the client computing device 10 is moving quickly along a road, the user is likely to be driving or riding in a motor vehicle. As another example, the processor 12 may be configured to use both the movement data 52 and the calendar data 50 when determining the activity 46. In the above example in which the calendar data 50 indicates that the user is between a first calendar event 51 having a first location and a second calendar event 51 having a second location, the processor 12 may use the movement data 52 and the location data 42 to determine that the user is in a moving vehicle.

In some embodiments, the processor 12 may be further configured to determine, at the activity inference model 38, a later activity 47 which the user is scheduled to perform at a later time. The later activity 47 may, for example, be indicated in the event description of a calendar event 51. The later activity 47 may additionally or alternatively be predicted based on past activity data collected for the user or for a sample including a plurality of users. The processor 12 may, for example, determine that the user typically leaves work around 5:30 PM, and may accordingly predict the later activity 47 to be "commuting" during a period of time following 5:30 PM.

In embodiments in which the processor 12 is configured to determine a later activity 47 for the user, the processor 12 may be further configured to determine the estimated distraction level 48 for the user based at least in part on the later activity 47. For example, the processor 12 may determine when the later activity 47 is "business meeting," the estimated distraction level 48 of the user shortly before the later activity 47 is scheduled to start is lower than the estimated distraction level 48 would be if the later activity 47 were "meeting with friend."

In some embodiments, the processor 12 may be further configured to determine an estimated user access duration 66 for the content item summary 64. The estimated user access duration may be computed at the activity inference model 38 and may be an amount of time the user is predicted to spend consuming the content item summary 64. In some embodiments, the processor 12 may be configured to use the calendar data 50 to determine the estimated user access duration 66. For example, the processor 12 may determine that the user has a calendar event 51 that begins five minutes after the time at which the user request 34 was received. Thus, the processor 12 may set the estimated user access duration 66 to five or fewer minutes. In some embodiments, the estimated user access duration 66 may be determined based on one or more later activities 47 the user is predicted to perform. For example, the processor 12 may be configured to determine whether an upcoming calendar event 51 would interrupt the user's ability to access the content item summary 64 and may determine the estimated user access duration 66 accordingly.

Additionally or alternatively, the processor 12 may be configured to determine the estimated user access duration based at least in part on data received from a navigation application program 80, as shown in FIG. 2. For example, the contextual metadata 40 may include location data 42, a transportation mode 53, and destination data 55 received from the navigation application program 80. In this example, based on the location data 42, the movement data 52, and the transportation mode 53, the destination data 55, The processor 12 may be configured to estimate an amount of time until the user arrives at the destination indicated by the destination data 55. The processor 12 may then set the estimated user access duration 66 to be less than or equal to the estimated time.

The processor 12 may be further configured to determine an estimated distraction level 48 for the user based on the contextual metadata 40. As used herein, estimated distraction level refers to an estimated level to which interruptions caused by the one or more activities in which the user is determined to be engaged inhibit the user from performing the task of understanding the content to be presented. The level is said to be estimated because the one or more activities in which the user is determined to be engaged are estimated based on a variety of factors as discussed herein, and those activities themselves have associated distraction levels that may be set at predetermined values for those activities. The estimated distraction level 48 may be determined at the activity inference model 38. In embodiments in which the estimated distraction level 48 is determined at the activity inference model 38, the processor 12 may be configured to determine the estimated distraction level 48 based at least in part on the activity 46. The estimated distraction level 48 may, for example indicate an estimated probability and/or frequency with which interruptions are predicted to occur in the user's consumption of the content item summary 64. These probabilities may be based on prior studies or models, for example. According to one example, the estimated distraction level 48 may be selected from among a plurality of discrete distraction levels, such as "low distraction," "medium distraction," "high distraction," and "unable to consume summary." In other embodiments, the estimated distraction level 48 may be a numerical value, such as an estimated ratio of time spent reading/listening to the content item summary 64 to time spent performing other tasks during a window of time in which the client computing device 10 is configured to output the content item summary 64. When two activities or more are detected, the estimated distraction level 48 may be set to be the highest of the distraction levels associated with the activities. Alternatively, the estimated distraction levels 48 of the two or more activities may be summed to determine an aggregate distraction level.

In one example, the processor 12 may determine, at the activity inference model 38, that the user is driving. Based on the determination that the user is driving, the activity inference model 38 may set the estimated distraction level 48 to "high distraction." In another example, the processor 12 may determine, at the activity inference model 38, that the user is eating. Based on the determination that the user is eating, the activity inference model 38 may set the estimated distraction level to "medium distraction."

In some embodiments, the distraction level estimate 48 may include a plurality of output-modality-specific estimated distraction levels rather than a single discrete-valued or scalar-valued estimated distraction level 48. An output-modality-specific estimated distraction level may indicate a probability and/or frequency with which the user is estimated to experience interruption when consuming a content item summary 64 that is output with a corresponding output modality 62. For example, the processor 12 may be configured to compute respective output-modality-specific estimated distraction levels for speech and text. In this example, the speech-specific estimated distraction level and the text-specific estimated distraction level may be different during some activities 46. When the processor 12 determines that the user is driving, the processor 12 may, for example, be configured to set the speech-specific estimated distraction level to "high distraction" and set the text-specific estimated distraction level to "unable to consume summary."

Returning to FIG. 1, the processor 12 may be further configured to generate a contextual framework 60 for the plurality of content item features 32. The contextual framework 60 may be a template which may be populated with content item features 32 in order to generate the content item summary 64, as discussed in further detail below. The contextual framework 60 may include a plurality of content item feature spaces 61 into which corresponding content item features 32 extracted from the content item 30 may be inserted.

In addition, the contextual framework 60 may include one or more output modalities 62 with which the content item summary 64 is configured to be output. In some embodiments, the contextual framework 60 may specify an output modality 62 for the entire content item summary 64. Alternatively, the contextual framework 60 may indicate a respective output modality 62 for each content item feature space 61. As discussed above, the one or more output modalities 62 included in the contextual framework 60 may be selected based at least in part on the estimated distraction level 48 determined at the activity inference model 38. Additionally or alternatively, the one or more output modalities 62 may be determined based on one or more of the activity 46, the later activity 47, and the estimated user access duration 66. For example, the processor 12 may be configured to select displayed text as the output modality 62 when the activity 46 is determined to be "eating".

Figure 4A:
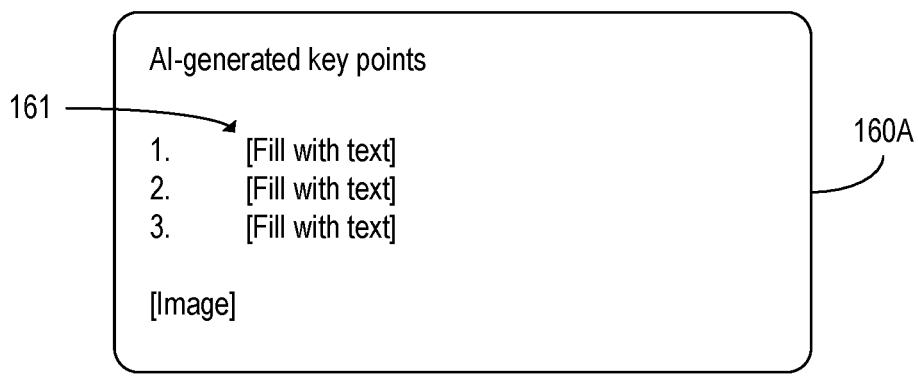
FIG. 4A shows an example contextual framework including a plurality of content item feature spaces, according to the embodiment of FIG. 1.

FIG. 4A shows an example contextual framework 160A. In the example of FIG. 4A, the contextual framework 160A includes respective content item feature spaces 161 for a list of key points and an image. A respective output modality 62 is specified for each of the content item feature spaces 161.

The contextual framework 60 may be determined based at least in part on the estimated distraction level 48. For example, the processor 12 may be configured to include fewer content item feature spaces 61 in the contextual framework 60 when the estimated distraction level 48 is higher. In embodiments in which the processor 12 is configured to determine a plurality of output-modality-specific estimated distraction levels, the processor 12 may be configured to select an output modality 62 for the content item summary 64 that has a lowest estimated distraction level of the plurality of the output-modality-specific estimated distraction levels.

Figure 4B:
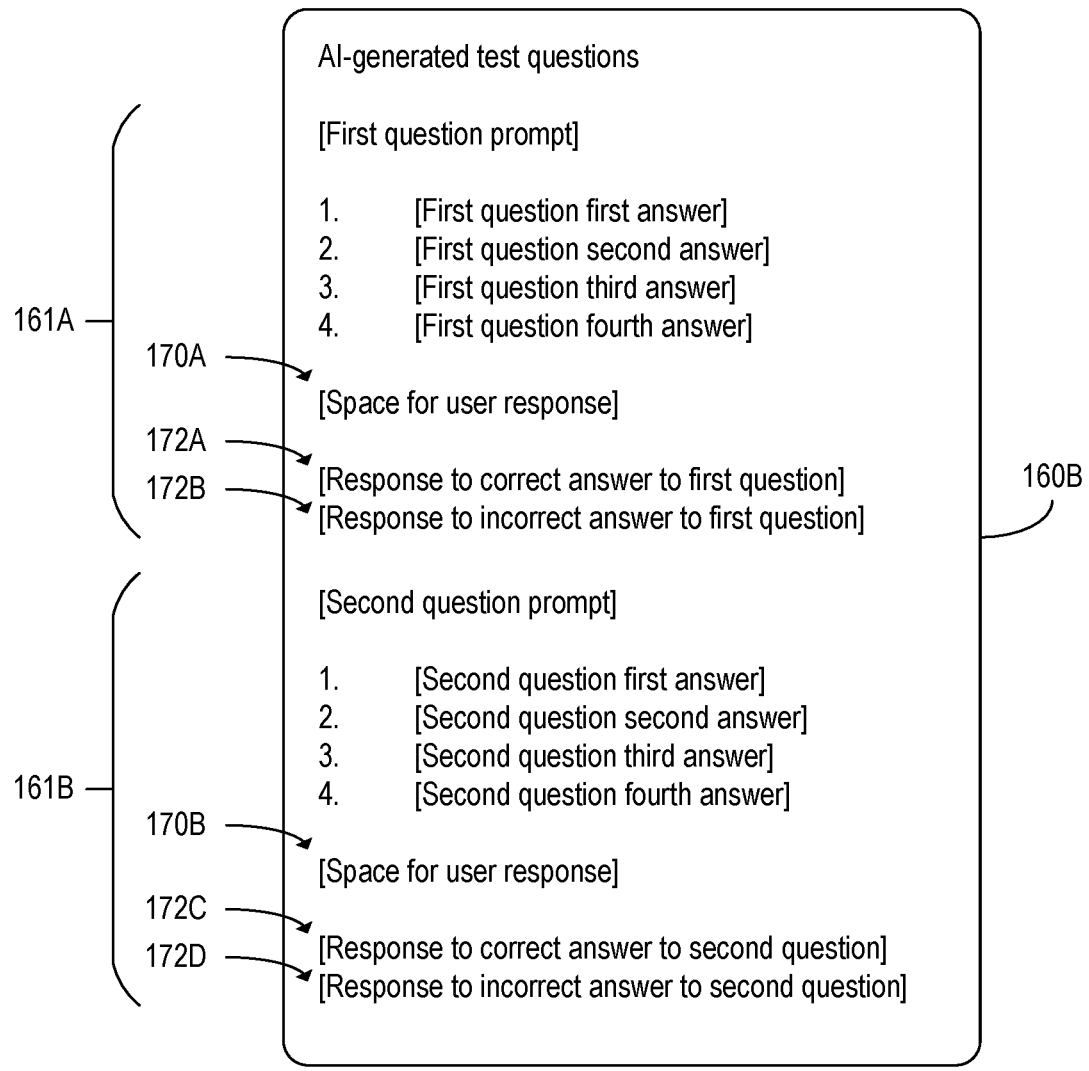
FIG. 4B shows another example contextual framework including a plurality of content item feature spaces for interactable test questions, according to the embodiment of FIG. 1.

The generation of the contextual framework 60 may be further based on the activity 46 in which the user is engaged when the user request 34 is received. For example, when the processor 12 determines that the activity 46 is "studying," the processor 12 may include respective content item feature spaces 161 for one or more interactable test questions, as shown in FIG. 4B.

The contextual framework 60 may also be generated based at least in part on the estimated user access duration 66. The processor 12 may, in some embodiments, be configured to increase the number of content item feature spaces 61 included in the contextual framework 60 as the estimated user access duration 66 increases. In such embodiments, the content item feature spaces 61 may be weighted based on their respective output modalities 62 to account for differences in the amounts of time the user is estimated to spend consuming content item features 32 with different output modalities (e.g. spoken text versus displayed text).

The processor 12 may be further configured to select a subset 33 of the plurality of content item features 32 extracted from the content item 30. The subset 33 of content item features 32 may be selected based on the contextual metadata 40. The subset 33 of the plurality of content item features 32 may be selected based on the contextual metadata 40 directly, or based on one or more of the activity 46, the estimated distraction level 48, and the estimated user access duration 66 determined at the activity inference model 38. In some embodiments, the subset 33 may be selected at a machine learning model that is configured to receive the plurality of content item features 32 and the contextual metadata 40 as inputs. Additionally or alternatively, a rule-based model may be used to select the subset 33 of content item features 32. In the example of FIG. 1, the subset 33 may be selected at the activity inference model 38. Alternatively, the subset 33 may be selected at the feature extraction model 31 or some other machine learning model or rule-based model.

When the processor 12 selects the subset 33 of content item features 32, the processor 12 may be further configured to determine an estimated relevance level 35 for each of those content item features 32. The estimated relevance level 35 of a content item feature 32 may, for example, indicate a level of importance of that content item feature 32 relative to the other content item features 32 included in the subset 33, or relative to a baseline relevance level. The estimated relevance level for a content item 35 may be determined based at least in part on the estimated user access duration 66. For example, a distribution of the estimated relevance levels 35 of the plurality of content item features 32 may be more skewed toward higher-relevance content item features 32 when the estimated user access duration is shorter 66, such that a smaller number of content item features 32 are prioritized when the content item summary 64 is generated. As another example, the estimate relevance levels 35 of the content item features 32 may be determined based at least in part on a source of the content item 30 from which those content item features 32 were extracted. For example, when the content item 30 is a document received from a work colleague, the content item features 32 extracted from that content item 30 may be determined to have higher estimated relevance levels 35 than content item features 32 extracted from a news article.

In embodiments in which the processor 12 is configured to generate a contextual framework 60, the processor 12 may generate the contextual framework 60 based at least in part on the subset 33 of the plurality of content item features 32. In such embodiments, the processor 12 may generate the contextual framework 60 to include a corresponding content item feature space 61 for each content item feature 32 included in the subset 33. The processor 12 may be further configured to generate the contextual framework 60 based at least in part on the estimated relevance levels 35 of the content item features 32 included in the subset 33. For example, the processor 12 may increase a proportion of the contextual framework 60 devoted to a content item feature space 61 for a content item feature 32 when the estimated relevance level 35 for that content item feature 32 is higher. As another example, a content item feature space 61 for a content item feature 32 with a higher estimated relevance level 35 may occur earlier in the contextual framework 60 than a content item feature space 61 for a content item feature 32 with a lower estimated relevance level 35.

The processor 12 may be further configured to generate the content item summary 64. The content item summary 64 may be generated at least in part by organizing the subset 33 of the plurality of content item features 32 according to the contextual framework 60. In such embodiments, the processor 12 may be configured to fill each content item feature space 61 included in the contextual framework 60 with a content item feature 32 included in the subset 33. The respective output modality 62 of each content item feature 32 included in the content item summary 64 may be set as indicated in the contextual framework 60 when the content item summary is generated. The processor 12 may convey the content item summary 64 for output such that each content item feature 32 included in the content item summary 64 is conveyed for output on an output device 18 of the one or more output devices 18 that has the respective output modality 62 selected for that content item feature 32.

Since the contextual framework 60 is generated based on the activity 46, the later activity 47, the estimated distraction level 48, and/or the estimated user access duration 66 as determined at the activity inference model 38, the content item summary 64 may therefore also be generated based on one or more of the activity 46, the later activity 47, the estimated distraction level 48, and the estimated user access duration 66. The contextual framework 60 may encode the information extracted from the contextual metadata 40 by the activity inference model 38 in a form that is configured to be used to structure the content item summary 64.

In other embodiments, rather than generating a contextual framework 60, the processor 12 may instead generate the content item summary 64 directly from the subset 33 and at least one of the activity 46, the later activity 47, the estimated distraction level 48, and the estimated user access duration 66 determined at the activity inference model 38.

The content item summary 64 may include one or more interactable elements 68. Each of the one or more interactable elements 68 may be a GUI element displayed on a display of the client computing device 10. Alternatively, an interactable element 68 may be a spoken prompt for input. When the content item summary 64 includes one or more interactable elements, the processor 12 may be further configured to receive an additional user input 70 interacting with the interactable element 68 included in the content item summary 64. The additional user input 70 may, for example, be a selection of a GUI element using a touchscreen, trackpad, mouse, or keyboard. In other examples, the additional user input 70 may be a speech input, a device movement, or some other type of input. The additional user input 70 may be made using any of the input devices 16 included in the client computing device 10.

In response to receiving the additional user input 70, the processor 12 may be further configured to convey, for output on the one or more output devices 18, at least one additional content item feature 72 not included in the content item summary 64. The at least one additional content item feature 72 may be a content item feature 32 of the plurality of content item features 32 that is not included in the subset 33. For example, the user may enter an additional user input 70 requesting additional details related to a portion of the content item summary 64. In response to this additional user input 70, the processor 12 may be configured to retrieve one or more additional content item features 72 related to that portion of the content item summary 64 from the content item 30. As another example, in response to such a request for additional detail, the processor 12 may be configured to convey the content item 30 for output on the client computing device 10.

Alternatively, the at least one additional content item feature 72 may be a feature not sourced from the content item 30. For example, when the interactable element 68 is a hyperlink included in the content item summary 64, the additional content item feature 72 may be a webpage that is opened when the hyperlink is selected. As another example, when the user is unfamiliar with a term or acronym used in the content item summary 64, the user may make an additional user input 70 requesting a definition of the term or acronym. In response to receiving this additional user input 70, the processor 12 may be configured to open a web search, online dictionary, or dictionary application program and search for a definition of the term or acronym.

The contextual framework 60 may, as shown in the example of FIG. 4B, indicate one or more additional user input spaces 170 and one or more corresponding additional content item feature spaces 172. FIG. 4B shows a contextual framework 160B for a content item summary 64 that includes one or more of interactable test questions, as discussed above. The contextual framework 160B of FIG. 4B includes two content item feature spaces 161A and 161B that may be filled with a first interactable test question and a second interactable test question respectively. In the example of FIG. 4B, each interactable test question is a multiple-choice question having a prompt and four candidate answers. The content item feature spaces 161A and 161B for interactable test questions respectively include additional user input spaces 170A and 170B that indicate points at which the processor 12 is configured to wait for additional user inputs 70 when presenting the content item summary 64. In addition, the content item feature spaces 161A and 161B shown in FIG. 4B both include additional content item feature spaces 172A, 172B, 172C, and 172D into which additional content item features 72 may be inserted when the content item summary 64 is generated. The first content item feature space 161A has a first additional content item feature space 172A for a response to a correct answer to the first interactable test question and a second additional content item feature space 172B for a response to an incorrect answer to the first interactable test question. The second content item feature space 161B has a third additional content item feature space 172C for a response to a correct answer to the second interactable test question and a fourth additional content item feature space 172D for a response to an incorrect answer to the second interactable test question.

FIG. 5A shows an example GUI 90 displayed on a client computing device 10 when the client computing device 10 outputs a content item summary 64. In the example of FIG. 5A, the processor 12 is configured to divide the content item summary 64 into a plurality of summary segments 64A, 64B, and 64C. The summary segments included in a content item summary 64 may be output with different output modalities. In the example of FIG. 5A, the summary segments 64A and 64B are displayed in the GUI 90, whereas the summary segment 64C is a speech output. In some embodiments, the content item summary 64 may be divided into summary segments based on the estimated distraction level 48. For example, the processor 12 may divide the content item summary 64 into a plurality of summary segments when the user's estimated distraction level 48 is categorized as "high distraction" but not divide the content item summary when the estimated distraction level 48 is determined to be "low distraction." Additionally or alternatively, the content item summary 64 may be divided into summary segments based at least in part on the estimated user access duration 66. For example, the processor 12 may be configured to divide the content item summary 64 into a plurality of summary segments when the estimated user access duration 66 is shorter than an estimated time required to consume the entire content item summary 64.

As shown in FIG. 5B, the processor 12 may be further configured to receive an additional user input 70A interacting with a specific summary segment 64D of the content item summary 64. In the example of FIG. 5B, the additional user input 70A is a speech input requesting the client computing device 10 to output the summary segment 64D in spoken form. In response to the additional user input 70A, the processor 12 conveys an additional content item 72A for output on a speaker included in the client computing device 10. The additional content item 72A in the example of FIG. 5B is a spoken version of the key points listed in the summary segment 64D.

Figure 5C:
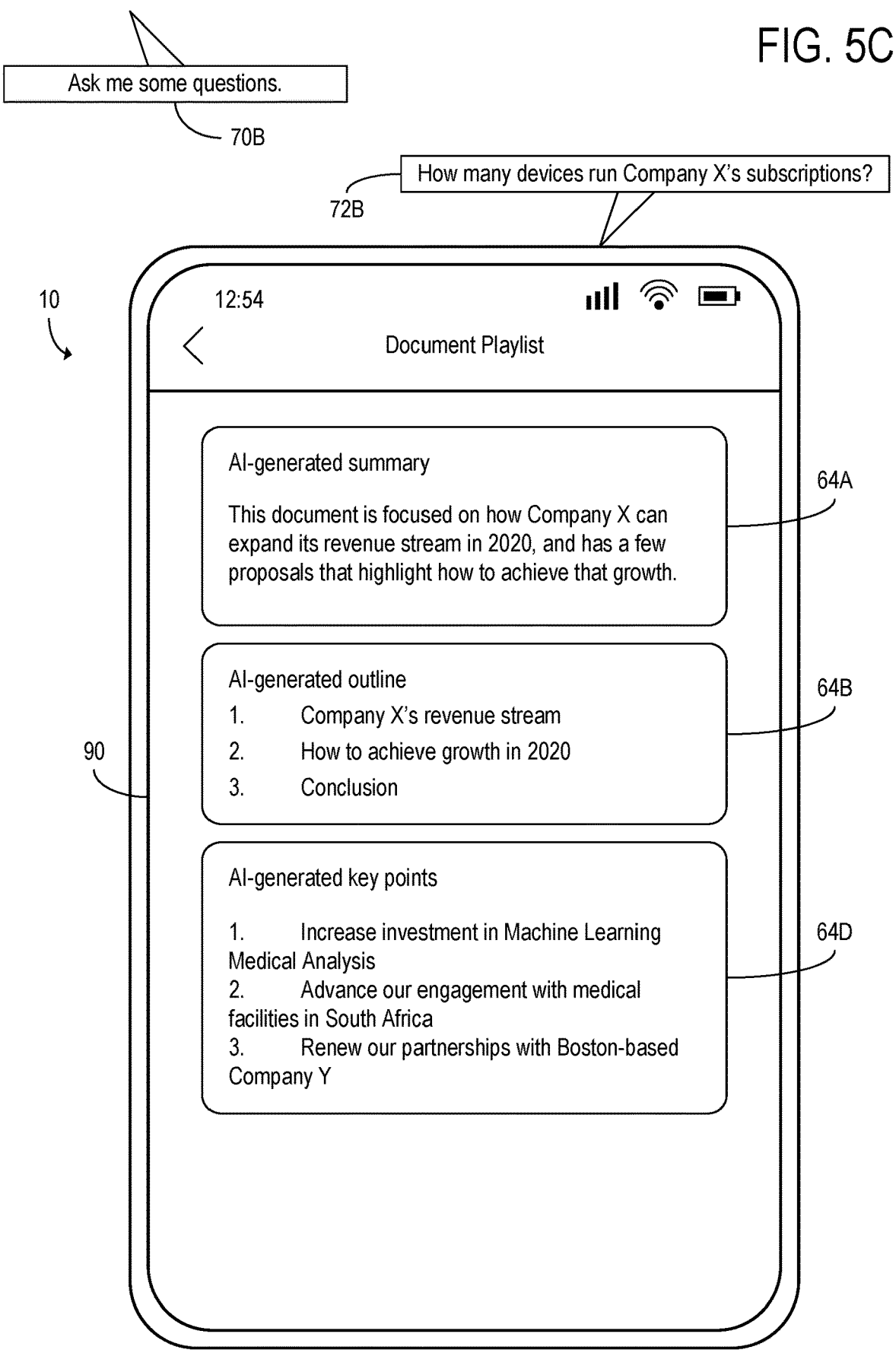
Figure 5D:
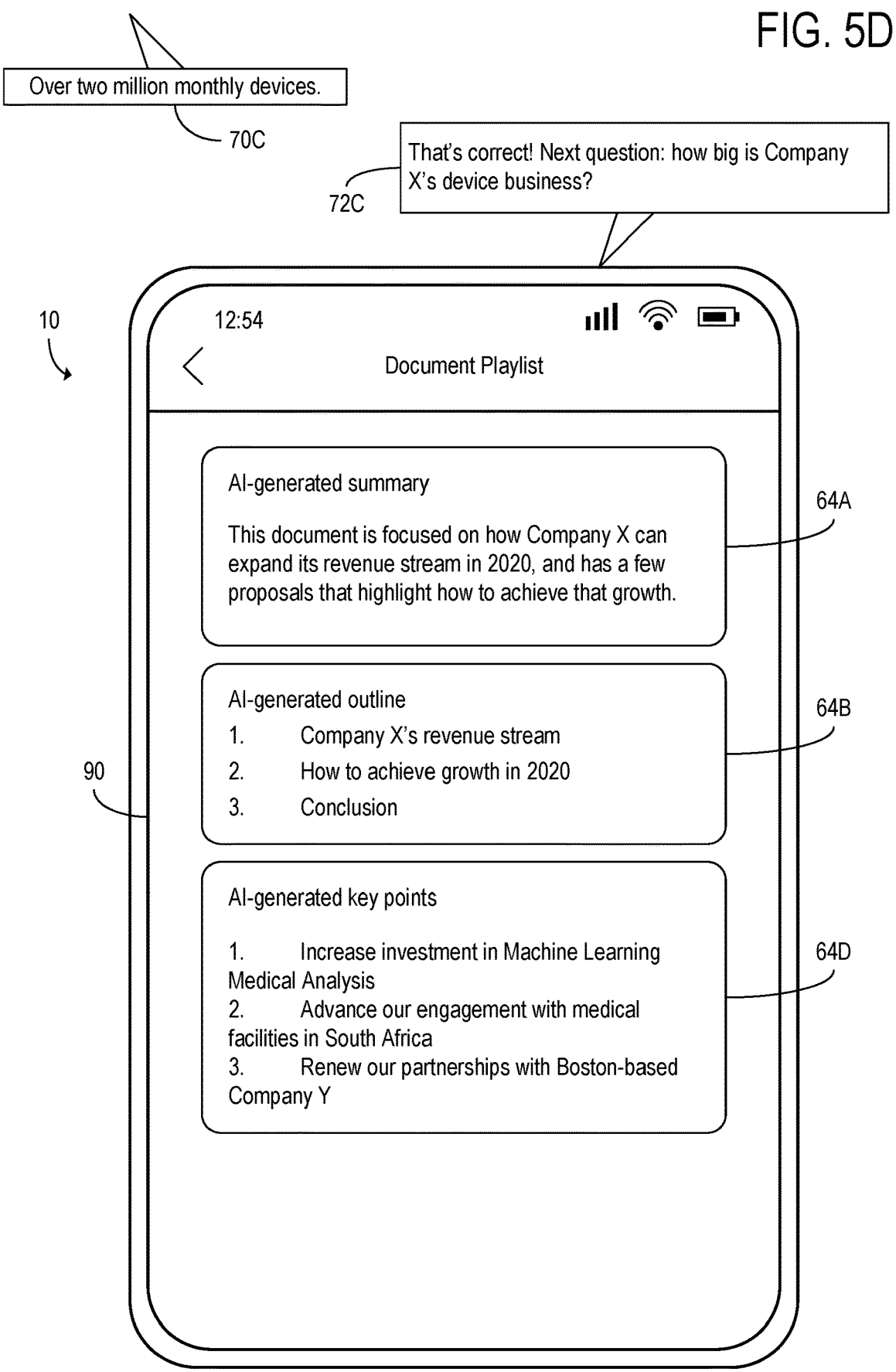

As shown in the example of FIGS. 5B-5D, the processor 12 may be configured to convey the summary segments for output on the one or more output devices 18 in a respective plurality of temporally separated output sessions. FIG. 5C shows an additional user input 70B in the form of a speech input that is made in a subsequent output session to the output session shown in FIG. 5B. In the example of FIG. 5C, the user makes the additional user input 70B to request one or more interactable test questions. In response to receiving the additional user input 70B, the processor 12 conveys an additional content item 72B in the form of a spoken interactable test question for output to the user. In FIG. 5D, the user enters an additional user input 70C, which in this example is a spoken input answering the interactable test question posed in the additional content item 72B. In response to the additional user input 70C, the processor 12 conveys an additional content item 72C for output to the user. The additional content item 72C indicates that the user has answered the interactable test question correctly and provides a prompt for another interactable test question.

Figure 6:
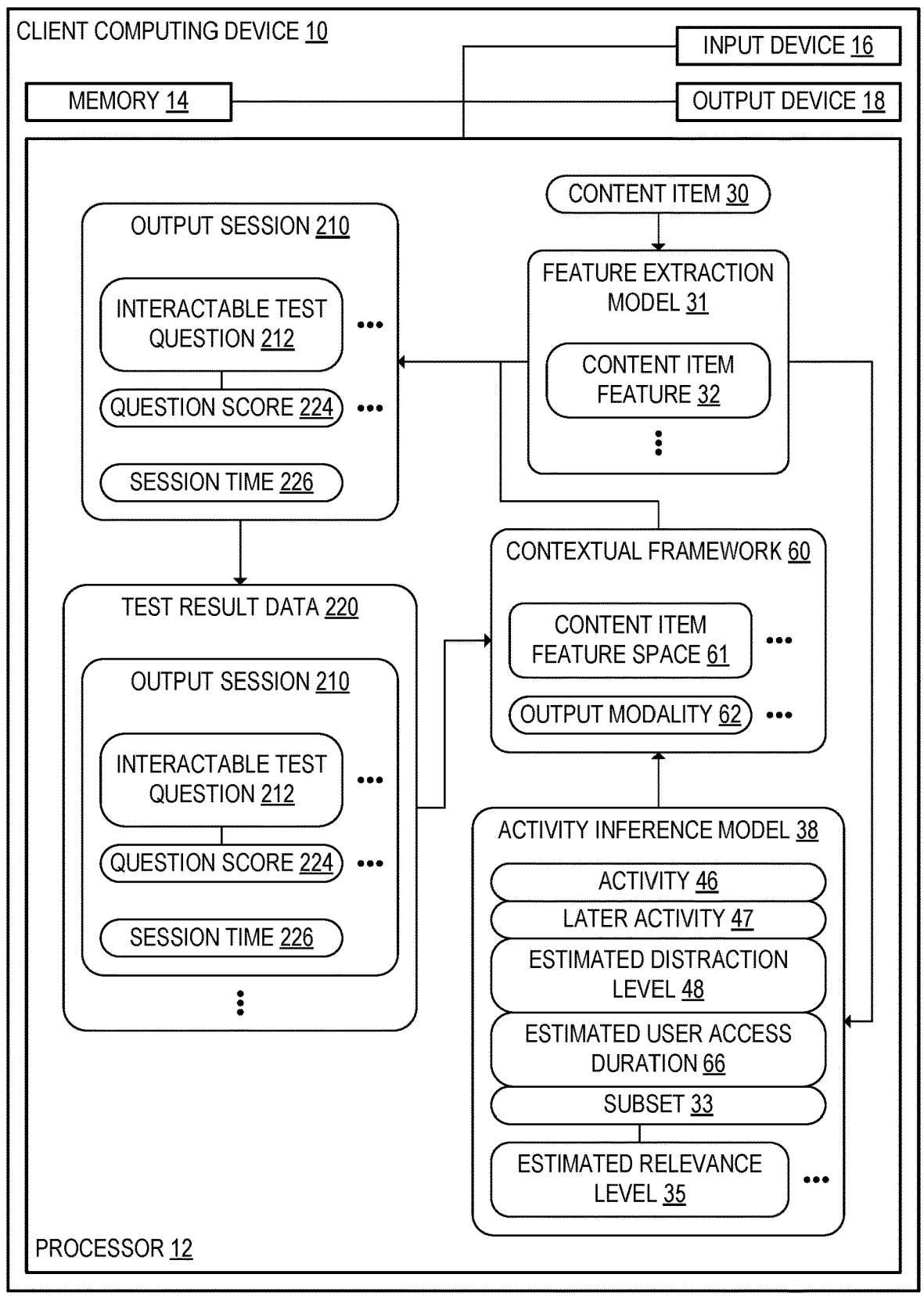
FIG. 6 shows the client computing device when a plurality of interactable test questions are output in a plurality of output sessions, according to the embodiment of FIG. 1.

In some embodiments, as shown in the example of FIG. 6, the processor 12 may be configured to present a plurality of interactable test questions 212 to the user according to a spaced repetition schedule. The plurality of interactable test questions 212 may be summary segments of a content item summary 64, as in the example of FIGS. 5B-5D. As shown in FIG. 6, one or more of the interactable test questions 212 may be output in a plurality of temporally separated output sessions 210. The processor 12 may be further configured to store test result data 220 for the output sessions 210 in the memory 14. The test result data 220 may indicate which interactable test questions 212 have been output in which output sessions 210. The test result data 220 may further indicate, for each interactable test question 212, a question score 224 indicating whether the user answered that interactable test question 212 correctly. In addition, the test result data 220 may indicate a session time 226 at which each output session 210 occurred. In output sessions 210 subsequent to an initial output session, the processor 12 may be configured to select the one or more interactable test questions 212 that are output in that output session 210 based at least in part on the test result data 220. For example, a probability that the processor 12 selects an interactable test question 212 for output may increase if the user has previously answered that interactable test question 212 incorrectly. The probability that the processor 12 selects the interactable test question 212 may also increase as the elapsed time since that interactable test question 212 was last output increases, as indicated by the one or more session times 226 included in the test result data 220.

Each output session 210 may have a corresponding contextual framework 60 for the one or more interactable test questions 212 output during that output session 210. The test result data 220 may be used as an additional input when generating the contextual framework 60 for the one or more interactable test questions 212 output in each output session 210. The one or more interactable test questions 212 may be further selected based on at least one of the activity 46, the later activity 47, the estimated distraction level 48, and the estimated user access duration 66.

Figure 7:
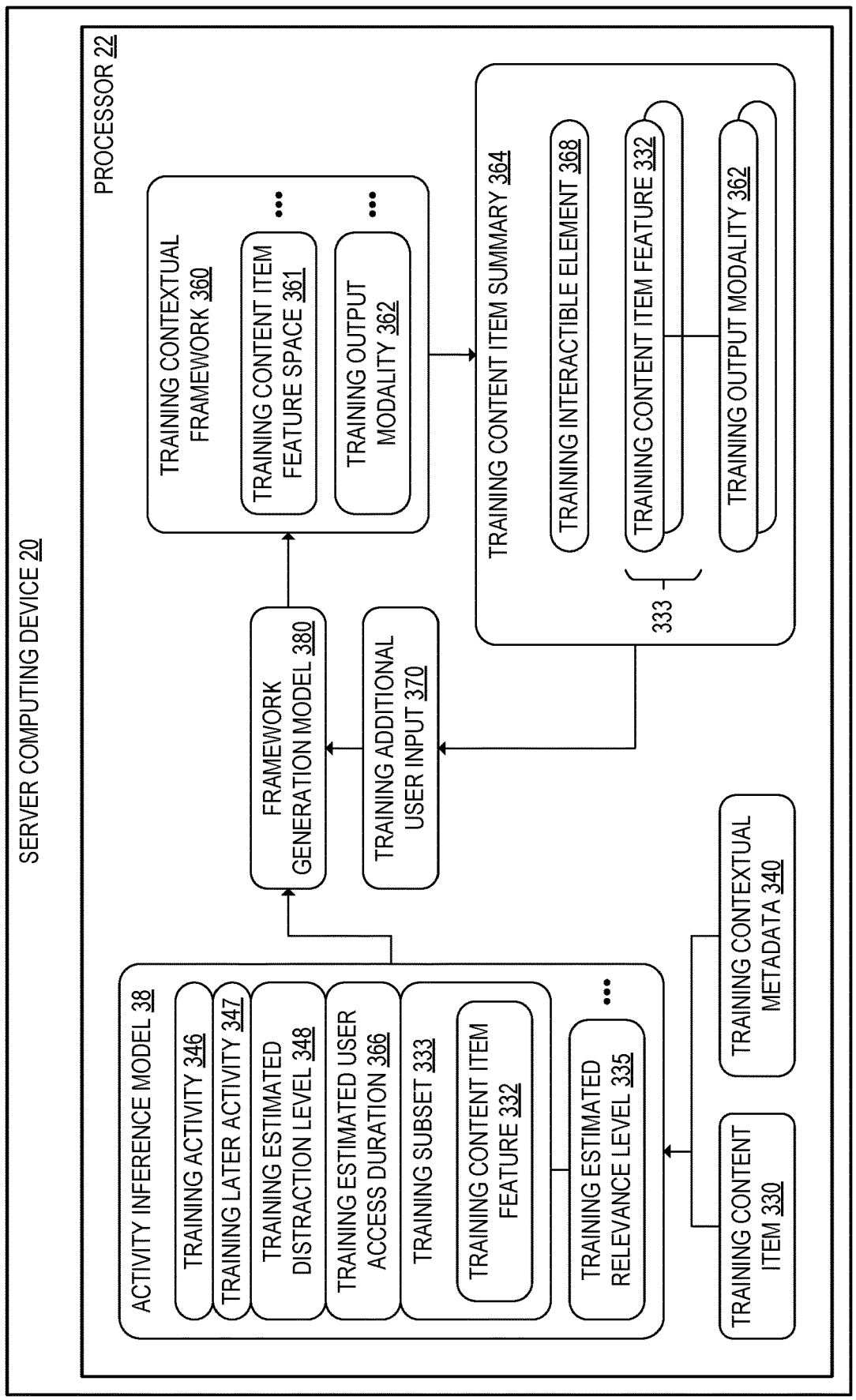
FIG. 7 shows the server computing device when a framework generation model is trained to generate the contextual framework, according to the embodiment of FIG. 1.

In some embodiments, the processor 12 may be configured to generate the contextual framework 60 at a machine learning model. As shown in the example of FIG. 7, the machine learning model at which the contextual framework 60 is generated may be a framework generation model 380 trained at the processor 22 of the server computing device 20. In FIG. 7, the framework generation model 380 is trained via supervised learning. The framework generation model 380 may be configured to receive training data from the activity inference model 38. This training data may be generated based on training contextual metadata 340 and may include at least one of a training activity 346, a training later activity 347, a training estimated distraction level 348, and a training estimated user access duration 366. In addition, the training data may include a training subset 333 of training content item features 332 of a training content item 330. When the activity inference model 38 estimates a training subset 333 of training content item features 332, the activity inference model 38 may be further configured to determine a respective training estimated relevance level 335 for each of those training content item features 332.

The framework generation model 380 may be configured to generate a training contextual framework 360 based on the training data. The training contextual framework 360 may include one or more training content feature spaces 361 into which the one or more training content item features 332 of the training subset 333 may be inserted to generate a training content item summary 364. In addition, the training contextual framework 360 may further include one or more training output modalities 362 of the one or more training content item features 332. The one or more training content feature spaces 361 and/or the one or more training output modalities 362 may be determined based at least in part on the training estimated relevance levels 335 of the training content item features 332 included in the training subset 333.

The training content item summary 364 may include the one or more training content item features 332 of the training subset 333 which have the one or more corresponding training output modalities 362 and are organized as specified by the training contextual framework 360. The training content item summary 364 may further include one or more training interactable elements 368.

In the example of FIG. 7, the framework generation model 380 may be trained via supervised learning. The processor 22 may be configured to receive one or more training additional user inputs 370 interacting with the one or more training interactable elements 368. For example, the one or more training additional user inputs 370 may be requests to include additional information in the training content item summary 364. As another example, a training additional user input 370 may be a request to output a training content item feature 332 with a different training output modality 362. In response to the one or more training additional user inputs 370, the processor 22 may be configured to update one or more parameters of the framework generation model 380.

During runtime, when the processor 12 of the client computing device 10 receives one or more additional user inputs 70 interacting with the content item summary 64, the processor 22 of the server computing device 20 may be further configured to make additional modifications to the framework generation model 380. In such embodiments, the processor 22 may be configured to update the framework generation model 380 during runtime via online learning based on the one or more additional user inputs 70. Online learning is a machine learning technique in which a machine learning model that has been trained prior to runtime use is further trained based on inputs received at runtime. For example, an instance of the framework generation model 380 may be customized for a specific user. Additionally or alternatively, a framework generation model 380 used for a plurality of different users may be updated based on the additional user inputs 70 received from one or more of those users.

Figure 8A:
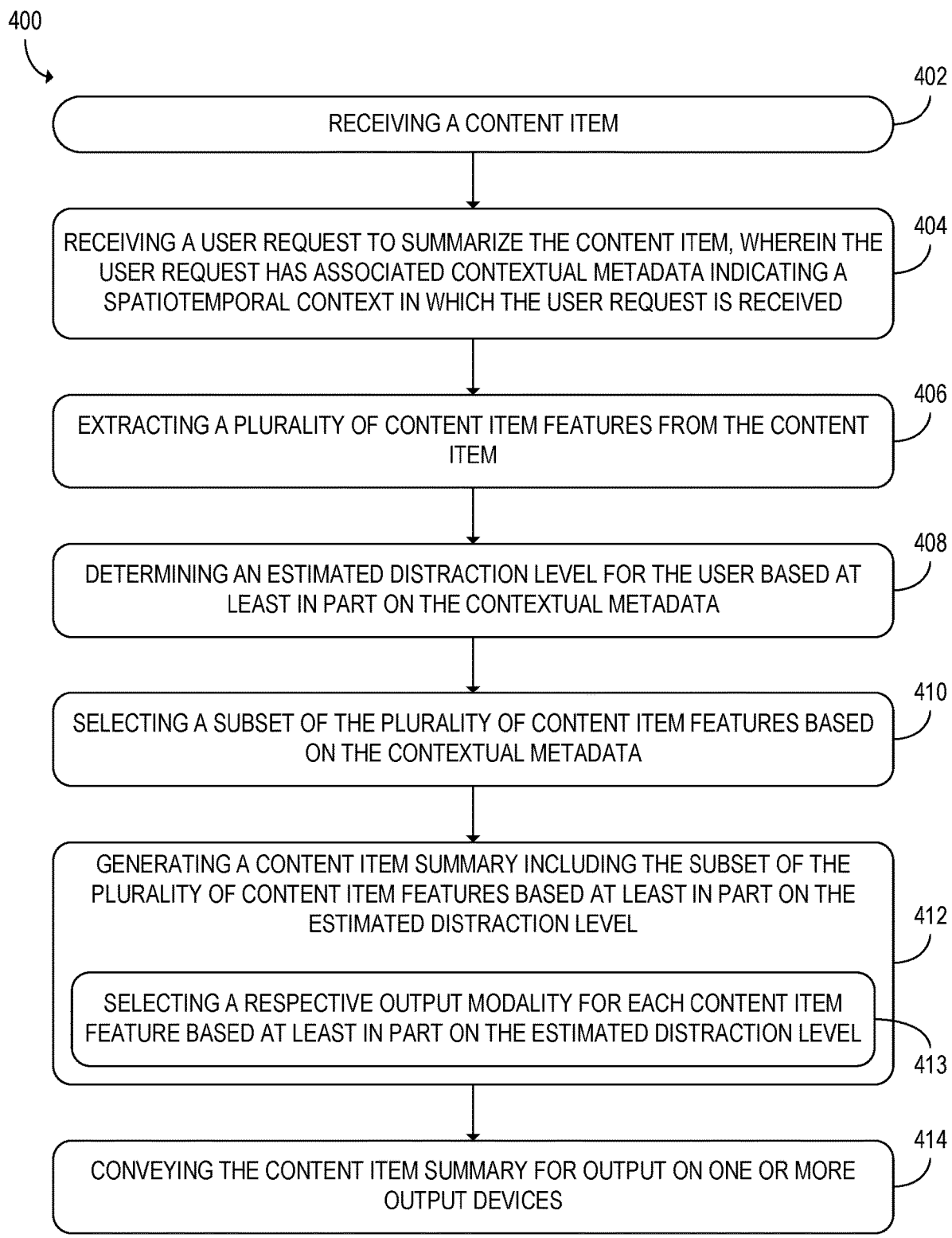
FIG. 8A shows a flowchart of an example method for generating a content item summary at a computing system, according to the embodiment of FIG. 1.

Turning now to FIG. 8A, a flowchart of method 400 for use with a computing system is provided. The method 400 may be used with the computing system 1 of FIG. 1 or with some other computing system. At step 402, the method 400 may include receiving a content item. For example, the content item may be a text document, a sound file, an image, a video, a slideshow, a spreadsheet, or some other type of content item. In some embodiments, the method may include receive a plurality of content items.

At step 404, the method 400 may further include receiving a user request to summarize the content item. The user request may be received via an input device of in a client computing device included in the computing system. In addition, the user request may have associated contextual metadata indicating a spatiotemporal context in which the user request is received. For example, the contextual metadata may include location data indicating a location of the client computing device when the user request is received. In some embodiments, when the client computing device is a mobile computing device, the contextual metadata may include movement data for the client computing device. Additionally or alternatively, the contextual metadata may include calendar data for the user. The calendar data may include time data indicating a time at which the user request is received. The calendar data may further include one or more calendar events included in the calendar data. Other types of data may also be included in the contextual metadata.

At step 406, the method 400 may further include extracting a plurality of content item features from the content item. The content item features may, for example, include one or more words, phrases, sentences, images, table entries, links, or other elements included in the content item. The content item features may be extracted at a feature extraction model, which may be a machine learning model.

At step 408, the method 400 may further include determining an estimated distraction level for the user based at least in part on the contextual metadata. For example, the estimated distraction level may be a scalar value, or may alternatively be one of a plurality of discrete levels. The estimated distraction level may indicate a probability or frequency with which the user is estimated to experience interruptions when consuming the content item summary. In some embodiments, the estimated distraction level may be computed at an activity inference model, which may be a machine learning model.

At step 410, the method 400 may further include selecting a subset of the plurality of content item features based on the contextual metadata. The subset may be selected for inclusion in the content item summary and may be selected at the activity inference model. In some embodiments, the subset may be selected based at least in part on the estimated distraction level, such that, for example, fewer content item features are selected when the estimated distraction level is higher.

At step 412, the method 400 may further include generating a content item summary including the subset of the plurality of content item features. The content item summary may be generated based at least in part on the estimated distraction level. For example, as discussed above, the number of content item features selected for inclusion in the content item summary may be based on the estimated distraction level. Additionally or alternatively, generating the content item summary may include, at step 413, selecting a respective output modality for each content item feature based at least in part on the estimated distraction level. The output modality for a content item feature may be an indication of the output device via which the content item feature is configured to be presented to the user.

At step 414, the method 400 may further include conveying the content item summary for output on one or more output devices. In embodiments in which generating the content item summary includes selecting a respective output modality for each content item feature, the content item summary may be conveyed for output such that each content item feature included in the content item summary is conveyed for output on an output device that has the respective output modality selected for that content item feature.

Figure 8B:
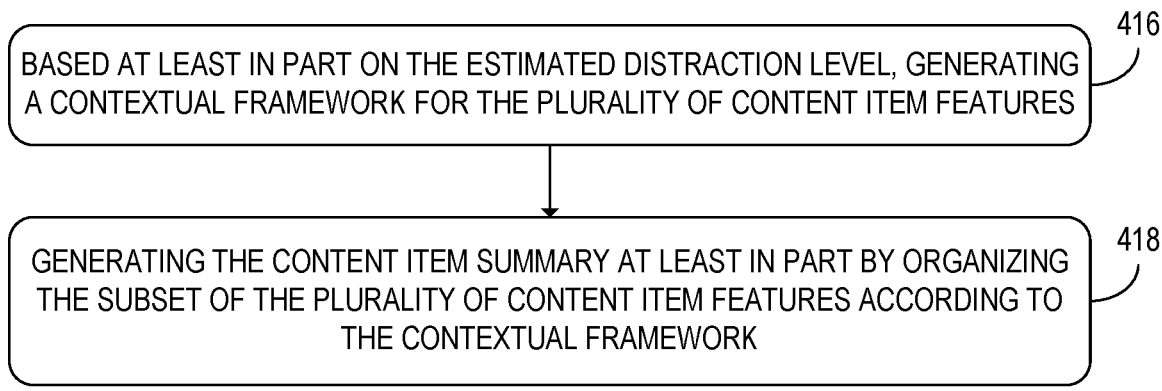
FIGS. 8B-8E show additional steps of the method of FIG. 8A that may be performed in some embodiments.

FIGS. 8B-8E show additional steps of the method 400 that may be performed in some embodiments. As shown in FIG. 8B, the method 400 may further include, at step 416, generating a contextual framework for the plurality of content item features. The contextual framework may be generated based at least in part on the estimated distraction level. The contextual framework may include a plurality of content item feature spaces into which the one or more content item features may be inserted. In addition, the contextual framework may include one or more output modalities with which the content item summary is configured to be output. At step 418, the method 400 may further include generating the content item summary at least in part by organizing the subset of the plurality of content item features according to the contextual framework. Thus, the contextual framework may be a contextually generated template for the content item summary.

Figure 8C:
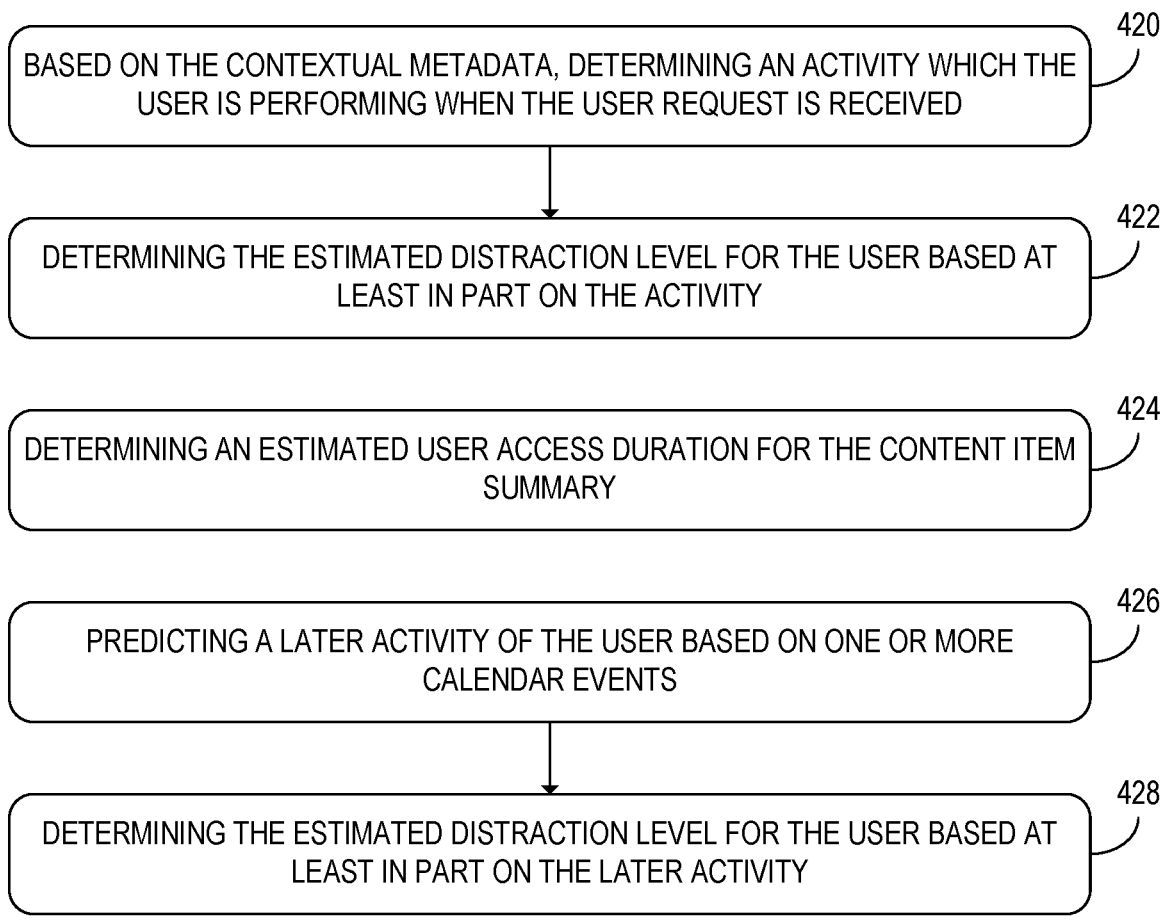

FIG. 8C shows a plurality of additional steps that may be performed when computing the estimated distraction level for the user. As shown in FIG. 8C, the method 400 may further include, at step 420, determining an activity which the user is performing when the user request is received. The activity may be determined based on the contextual metadata. Step 420 may be performed at an activity inference model, which may be a machine learning model. The method 400 may further include determining the estimated distraction level for the user based at least in part on the activity.

In some embodiments, the method 400 may further include, at step 424, determining an estimated user access duration for the content item summary. The estimated user access duration may be determined based at least in part on the estimated distraction level or the activity.

In embodiments in which the contextual metadata includes calendar data, the method 400 may further include, at step 426, predicting a later activity of the user based on the one or more calendar events. The later activity may be predicted at the activity inference model. In embodiments in which step 426 is performed, the method 400 may further include, at step 428, determining the estimated distraction level for the user based at least in part on the later activity. The estimated user access duration may also be determined based at least in part on the later activity.

Figure 8D:
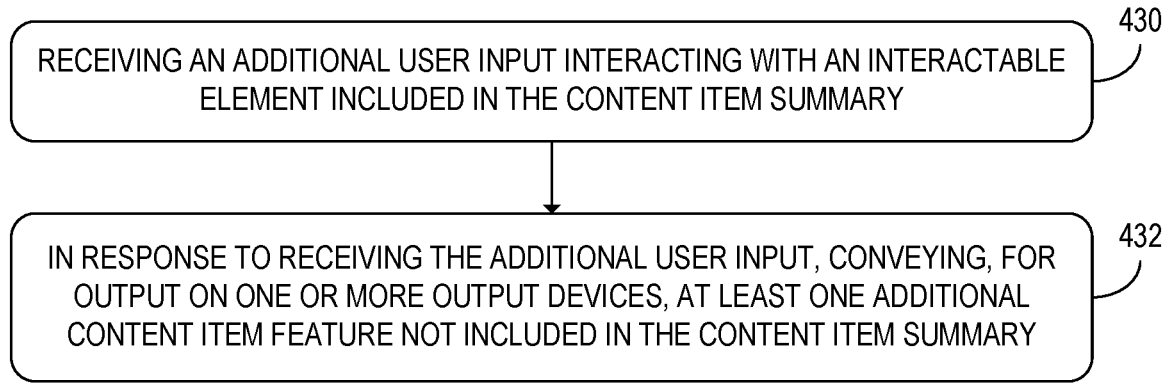

As shown in FIG. 8D, the method 400 may further include, at step 430, receiving an additional user input interacting with an interactable element included in the content item summary. The additional user input may be an interaction with a displayed interactable element and may be received via a GUI of the client computing device. Alternatively, the additional user input may be a speech input or some other type of input. At step 432, the method 400 may further include conveying, in response to receiving the additional user input, at least one additional content item feature not included in the content item summary for output on one or more output devices. In some embodiments, the interactable element may be an interactable test question. In such embodiments, the additional user input may be an answer to the interactable test question, and the additional content item may be an indication of whether the user answered the interactable test question correctly.

Figure 8E:
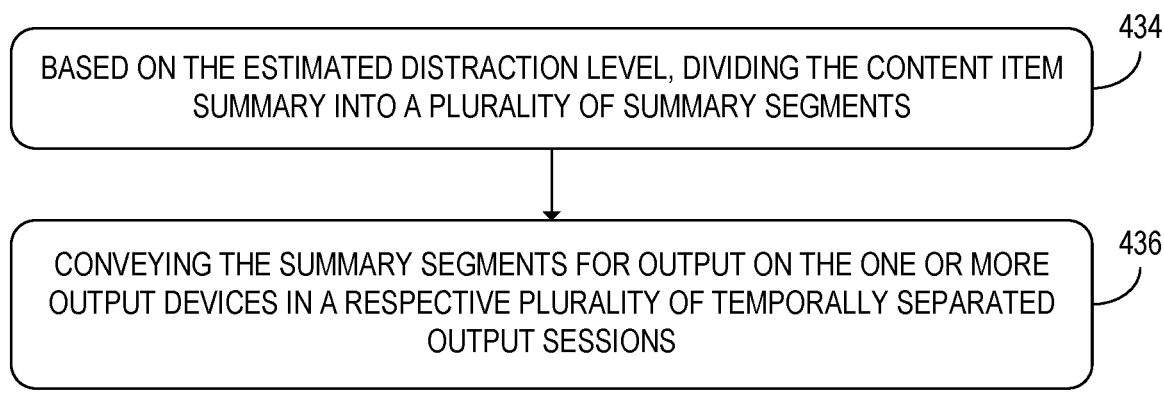

At step 434, the method 400 may further include, as shown in FIG. 8E, dividing the content item summary into a plurality of summary segments. The content item summary may be divided based on one or more of the activity, the later activity, the estimated distraction level, and the estimated user access duration. At step 436, the method 400 may further include conveying the summary segments for output on the one or more output devices in a respective plurality of temporally separated output sessions. For example, when the content item summary includes one or more interactable test questions, the summary segments may be conveyed for output according to a spaced repetition schedule.

Using the above systems and methods, content may be summarized for users in a context-dependent manner. Thus, a content item summary generated using the systems and methods discussed above may be more relevant and useful to the user in the circumstances in which the user requested the content item summary. In comparison to conventional methods of summarizing content, the above systems and methods may allow the user to use time more efficiently when consuming the content item summary and may allow the user to more easily recall the summarized information.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
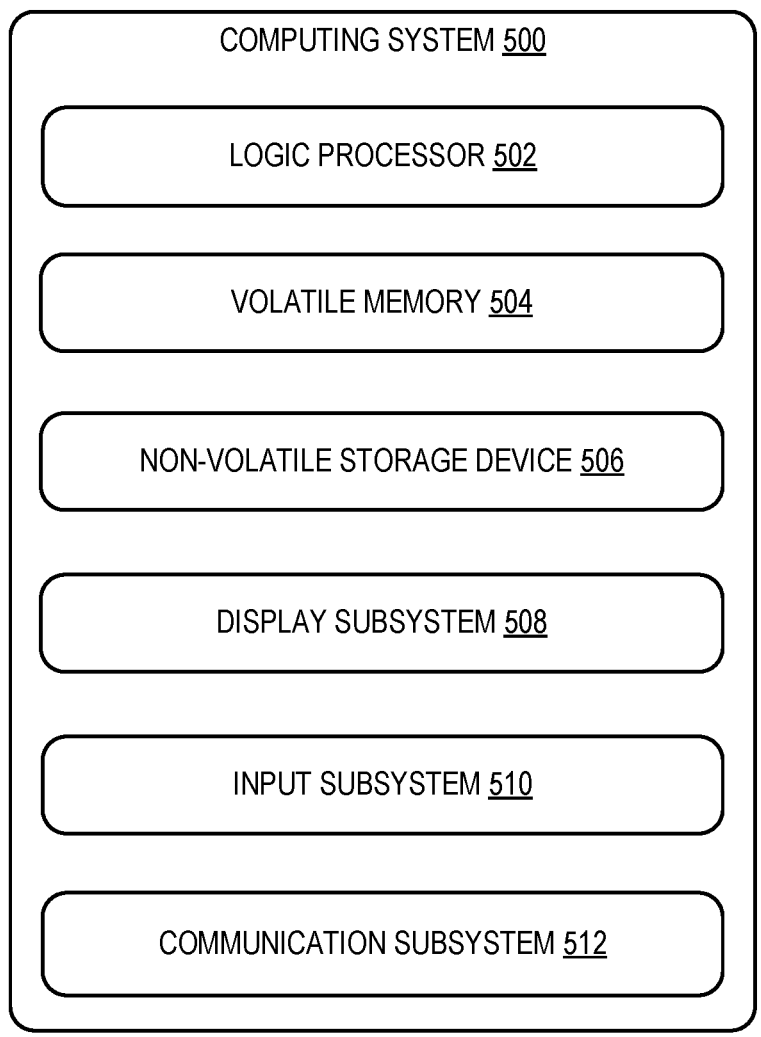
FIG. 9 shows a schematic view of an example computing environment in which the computing system of FIG. 1 may be enacted.

FIG. 9 schematically shows a non-limiting embodiment of a computing system 500 that can enact one or more of the methods and processes described above. Computing system 500 is shown in simplified form. Computing system 500 may embody the computing system 1 described above and illustrated in FIG. 1. Computing system 500 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 9.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing.

Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc.

The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs describe several aspects of the present disclosure. According to one aspect of the present disclosure, a computing system is provided, including a processor configured to receive a content item. The processor may be further configured to receive a user request to summarize the content item. The user request may have associated contextual metadata indicating a spatiotemporal context in which the user request is received. The processor may be further configured to extract a plurality of content item features from the content item. Based on the contextual metadata, the processor may be further configured to determine an estimated distraction level for the user. The processor may be further configured to select a subset of the plurality of content item features based on the contextual metadata. The processor may be further configured to generate a content item summary including the subset of the plurality of content item features based at least in part on the estimated distraction level. The processor may be further configured to convey the content item summary for output on one or more output devices.

According to this aspect, the processor may be further configured to, based at least in part on the estimated distraction level, generate a contextual framework for the plurality of content item features. The processor may be further configured to generate the content item summary at least in part by organizing the subset of the plurality of content item features according to the contextual framework.

According to this aspect, the processor may be configured to generate the contextual framework at a machine learning model. The processor may be further configured to, during runtime, receive one or more additional user inputs interacting with the content item summary. The processor may be further configured to update the machine learning model during runtime via online learning based on the one or more additional user inputs.

According to this aspect, the processor may be further configured to determine an estimated user access duration for the content item summary based on the contextual metadata.

According to this aspect, the processor may be further configured to, based on the contextual metadata, determine an activity which the user is performing when the user request is received. The processor may be further configured to determine the estimated distraction level for the user based at least in part on the activity.

According to this aspect, the contextual metadata may include movement data for a mobile computing device included in the computing system. The processor may be configured to determine the activity based at least in part on the movement data.

According to this aspect, the contextual metadata may include calendar data for the user. The processor may be configured to determine the activity based at least in part on one or more calendar events included in the calendar data.

According to this aspect, the processor may be further configured to predict a later activity of the user based on the one or more calendar events. The processor may be further configured to determine the estimated distraction level for the user based at least in part on the later activity.

According to this aspect, the processor may be further configured to receive an additional user input interacting with an interactable element included in the content item summary. In response to receiving the additional user input, the processor may be further configured to convey, for output on the one or more output devices, at least one additional content item feature not included in the content item summary.

According to this aspect, the interactable element may be an interactable test question.

According to this aspect, the processor may be further configured to, for each content item feature, select a respective output modality based at least in part on the estimated distraction level. The processor may be further configured to convey the content item summary for output such that each content item feature included in the content item summary is conveyed for output on an output device of the one or more output devices that has the respective output modality selected for that content item feature.

According to this aspect, the processor may be further configured to, based on the estimated distraction level, divide the content item summary into a plurality of summary segments. The processor may be further configured to convey the summary segments for output on the one or more output devices in a respective plurality of temporally separated output sessions.

According to another aspect of the present disclosure, a method for use with a computing system is provided. The method may include receiving a content item. The method may further include receiving a user request to summarize the content item. The user request may have associated contextual metadata indicating a spatiotemporal context in which the user request is received. The method may further include extracting a plurality of content item features from the content item. The method may further include determining an estimated distraction level for the user based at least in part on the contextual metadata. The method may further include selecting a subset of the plurality of content item features based on the contextual metadata. The method may further include generating a content item summary including the subset of the plurality of content item features based at least in part on the estimated distraction level. The method may further include conveying the content item summary for output on one or more output devices.

According to this aspect, the method may further include, based at least in part on the estimated distraction level, generating a contextual framework for the plurality of content item features. The method may further include generating the content item summary at least in part by organizing the subset of the plurality of content item features according to the contextual framework.

According to this aspect, the method may further include determining an estimated user access duration for the content item summary based on the contextual metadata.

According to this aspect, the method may further include, based on the contextual metadata, determining an activity which the user is performing when the user request is received. The method may further include determining the estimated distraction level for the user based at least in part on the activity.

According to this aspect, the contextual metadata may include movement data for a mobile computing device included in the computing system. The activity may be determined based at least in part on the movement data.

According to this aspect, the contextual metadata may include calendar data for the user. The activity may be determined based at least in part on one or more calendar events included in the calendar data.

According to this aspect, the method may further include receiving an additional user input interacting with an interactable element included in the content item summary. The method may further include, in response to receiving the additional user input, conveying, for output on the one or more output devices, at least one additional content item feature not included in the content item summary.

According to another aspect of the present disclosure, a computing system is provided, including a processor configured to receive a content item. The processor may be further configured to receive a user request to summarize the content item. The user request may have associated contextual metadata indicating a spatiotemporal context in which the user request is received. The processor may be further configured to extract a plurality of content item features from the content item. Based on the contextual metadata, the processor may be further configured to determine an activity which the user is performing when the user request is received. The processor may be further configured to determine an estimated distraction level for the user based at least in part on the activity. Based at least in part on the estimated distraction level, the processor may be further configured to generate a contextual framework for the plurality of content item features. The processor may be further configured to select a subset of the plurality of content item features based on the contextual metadata. The processor may be further configured to generate a content item summary at least in part by organizing the subset of the plurality of content item features according to the contextual framework. The processor may be further configured to convey the content item summary for output on one or more output devices indicated by the contextual framework.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor configured to:
receive a content item;
receive a user request to summarize the content item, wherein the user request has associated contextual metadata indicating a spatiotemporal context in which the user request is received;
extract a plurality of content item features from the content item;
based on the contextual metadata, determine an estimated distraction level for the user;
select a subset of the plurality of content item features based on the contextual metadata;
generate a content item summary including the subset of the plurality of content item features based at least in part on the estimated distraction level;
determine an estimated user access duration for the content item summary based on the contextual metadata;
determine that the estimated user access duration is shorter than an estimated consumption duration of the content item summary;
in response to determining that the estimated user access duration is shorter than the estimated consumption duration, based on the estimated distraction level and the estimated user access duration, divide the content item summary into a plurality of summary segments; and
convey the content item summary for output on one or more output devices in a plurality of temporally separated output sessions corresponding to the plurality of summary segments,
wherein the estimated distraction level indicates an estimated interruption frequency for the user during consumption of the content item summary.

2. The computing system of claim 1, wherein the processor is further configured to:
based at least in part on the estimated distraction level, generate a contextual framework for the plurality of content item features; and
generate the content item summary at least in part by organizing the subset of the plurality of content item features according to the contextual framework.

3. The computing system of claim 2, wherein:
the processor is configured to generate the contextual framework at a machine learning model; and the processor is further configured to:
during runtime, receive one or more additional user inputs interacting with the content item summary; and
update the machine learning model during runtime via online learning based on the one or more additional user inputs.

4. The computing system of claim 1, wherein the processor is further configured to:
based on the contextual metadata, determine an activity which the user is performing when the user request is received; and
determine the estimated distraction level for the user based at least in part on the activity.

5. The computing system of claim 4, wherein:
the contextual metadata includes movement data for a mobile computing device included in the computing system; and
the processor is configured to determine the activity based at least in part on the movement data.

6. The computing system of claim 4, wherein:
the contextual metadata includes calendar data for the user; and
the processor is configured to determine the activity based at least in part on one or more calendar events included in the calendar data.

7. The computing system of claim 6, wherein the processor is further configured to:
predict a later activity of the user based on the one or more calendar events; and
determine the estimated distraction level for the user based at least in part on the later activity.

8. The computing system of claim 1, wherein the processor is further configured to:
receive an additional user input interacting with an interactable element included in the content item summary; and
in response to receiving the additional user input, convey, for output on the one or more output devices, at least one additional content item feature not included in the content item summary.

9. The computing system of claim 8, wherein the interactable element is an interactable test question.

10. The computing system of claim 1, wherein the processor is further configured to:
for each content item feature, select a respective output modality based at least in part on the estimated distraction level; and
convey the content item summary for output such that each content item feature included in the content item summary is conveyed for output on an output device of the one or more output devices that has the respective output modality selected for that content item feature.

11. A method for use with a computing system, the method comprising:
receiving a content item;
receiving a user request to summarize the content item, wherein the user request has associated contextual metadata indicating a spatiotemporal context in which the user request is received;
extracting a plurality of content item features from the content item;
determining an estimated distraction level for the user based at least in part on the contextual metadata;
selecting a subset of the plurality of content item features based on the contextual metadata;

generating a content item summary including the subset of the plurality of content item features based at least in part on the estimated distraction level;
determining an estimated user access duration for the content item summary based on the contextual metadata;
determining that the estimated user access duration is shorter than an estimated consumption duration of the content item summary;
in response to determining that the estimated user access duration is shorter than the estimated consumption duration, based on the estimated distraction level and the estimated user access duration, dividing the content item summary into a plurality of summary segments; and
conveying the content item summary for output on one or more output devices in a plurality of temporally separated output sessions corresponding to the plurality of summary segments,
   wherein the estimated distraction level indicates an estimated interruption frequency for the user during consumption of the content item summary.

12. The method of claim 11, further comprising:
based at least in part on the estimated distraction level, generating a contextual framework for the plurality of content item features; and
generating the content item summary at least in part by organizing the subset of the plurality of content item features according to the contextual framework.

13. The method of claim 11, further comprising:
based on the contextual metadata, determining an activity which the user is performing when the user request is received; and
determining the estimated distraction level for the user based at least in part on the activity.

14. The method of claim 13, wherein:
the contextual metadata includes movement data for a mobile computing device included in the computing system; and
the activity is determined based at least in part on the movement data.

15. The method of claim 13, wherein:
the contextual metadata includes calendar data for the user; and
the activity is determined based at least in part on one or more calendar events included in the calendar data.

16. The method of claim 11, further comprising:
receiving an additional user input interacting with an interactable element included in the content item summary; and
in response to receiving the additional user input, conveying, for output on the one or more output devices, at least one additional content item feature not included in the content item summary.

17. A computing system comprising:
a processor configured to:
   receive a content item;
   receive a user request to summarize the content item, wherein the user request has associated contextual metadata indicating a spatiotemporal context in which the user request is received;
   extract a plurality of content item features from the content item;
   based on the contextual metadata, determine an activity which the user is performing when the user request is received;
   determine an estimated distraction level for the user based at least in part on the activity;
   based at least in part on the estimated distraction level, generate a contextual framework for the plurality of content item features;
   select a subset of the plurality of content item features based on the contextual metadata;
   generate a content item summary at least in part by organizing the subset of the plurality of content item features according to the contextual framework;
   determine an estimated user access duration for the content item summary based on the contextual metadata;
   determine that the estimated user access duration is shorter than an estimated consumption duration of the content item summary;
   in response to determining that the estimated user access duration is shorter than the estimated consumption duration, based on the estimated distraction level and the estimated user access duration, divide the content item summary into a plurality of summary segments; and
   convey the content item summary for output on one or more output devices indicated by the contextual framework in a plurality of temporally separated output sessions corresponding to the plurality of summary segments,
   wherein the estimated distraction level indicates an estimated interruption frequency for the user during consumption of the content item summary.

* * * * *